United States Patent [19]

Lisak

[11] Patent Number: 4,660,791
[45] Date of Patent: Apr. 28, 1987

[54] ELECTRONIC MODULE SUPPORT STAND

[76] Inventor: Robert B. Lisak, 6751 S. Karlov, Chicago, Ill. 60629

[21] Appl. No.: 700,283

[22] Filed: Feb. 11, 1985

[51] Int. Cl.$^4$ .............................................. F16L 3/00
[52] U.S. Cl. .................................... 248/122; 211/26; 248/141; 248/149; 248/150
[58] Field of Search ............... 248/122, 125, 149, 150, 248/172, 672, 676, 670, 173, 176, 140, 139, 141; 211/26

[56] References Cited

U.S. PATENT DOCUMENTS

| 256,540 | 4/1882 | Browne ................................ 248/122 |
| 2,795,388 | 6/1957 | Meyers ................................ 248/122 |
| 3,430,907 | 3/1969 | Bruhn et al. ........................ 248/140 |
| 4,002,398 | 1/1977 | Hanisch et al. .................... 211/26 X |
| 4,047,684 | 9/1977 | Kobayashi .......................... 248/122 |
| 4,278,223 | 7/1981 | Fauteux .............................. 248/125 |
| 4,520,981 | 6/1985 | Harrigan .......................... 248/125 X |

FOREIGN PATENT DOCUMENTS

| 3246779 | 6/1984 | Fed. Rep. of Germany ........ 248/51 |
| 1330450 | 5/1963 | France ................................ 248/149 |

Primary Examiner—Robert W. Gibson, Jr.
Assistant Examiner—David L. Talbott
Attorney, Agent, or Firm—Emrich & Dithmar

[57] ABSTRACT

An adjustable support stand is particularly adapted for securely positioning an electronic module, or modules, over a wide range of heights and tilt angles to facilitate the exercise of control thereover by an operator. The support stand includes a base and an open mounting rack of standard width within which the electronic module may be securely mounted. A manually controlled locking mechanism permits the tilt angle of the mounting rack and electronic module to be adjusted over a wide angular continuum. In one embodiment, a boom is mounted to an upper portion of the support stand for supporting a microphone as well as the mounting rack. In another embodiment, the mounting rack is coupled to an in-line rack support frame and is free to pivot vertically therein. The in-line rack support frame is mounted to an upper portion of the base and is free to rotate thereon in providing multi-axis displacement of the electronic module. The adjustable support stand permits the electronic module to be positioned as desired by an operator, such as a singer or a musician, who then has easy access to the various controls on the module.

9 Claims, 10 Drawing Figures

U.S. Patent    Apr. 28, 1987    4,660,791
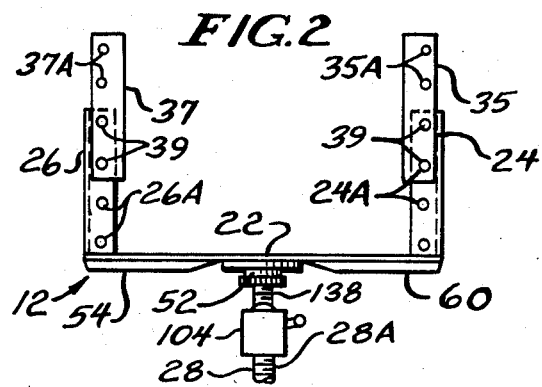
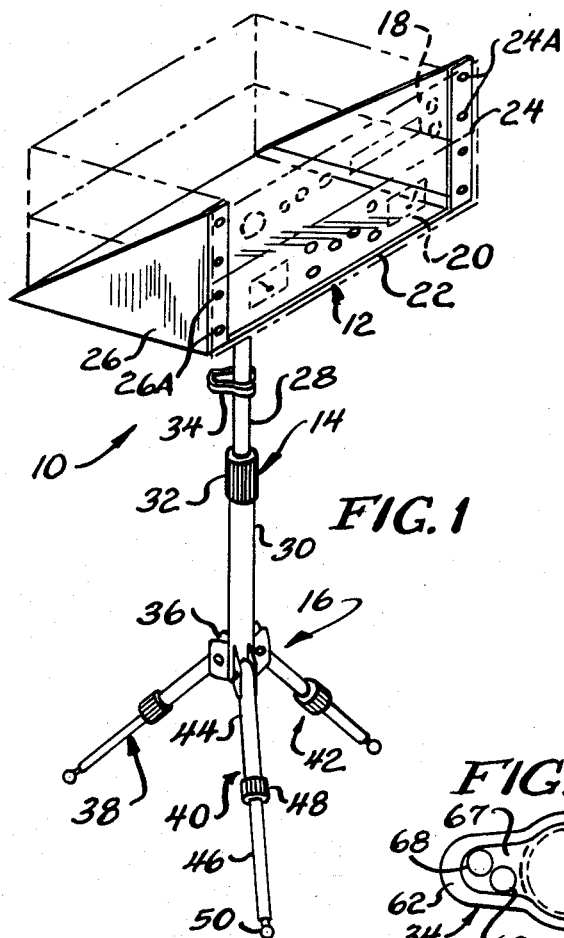
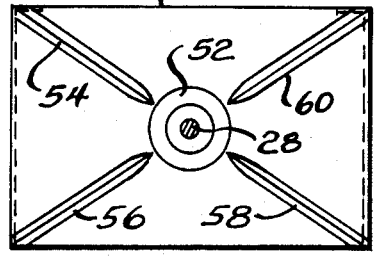
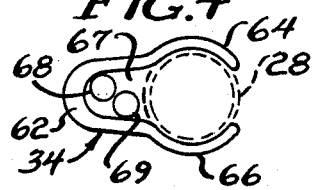
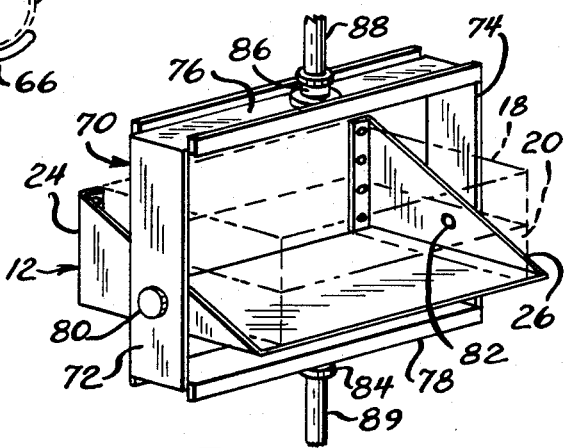
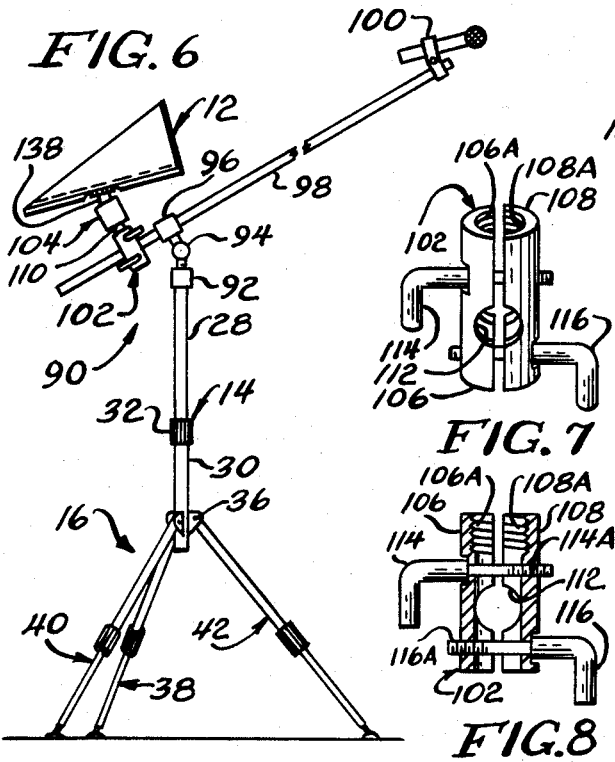
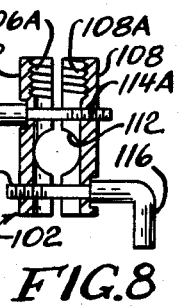
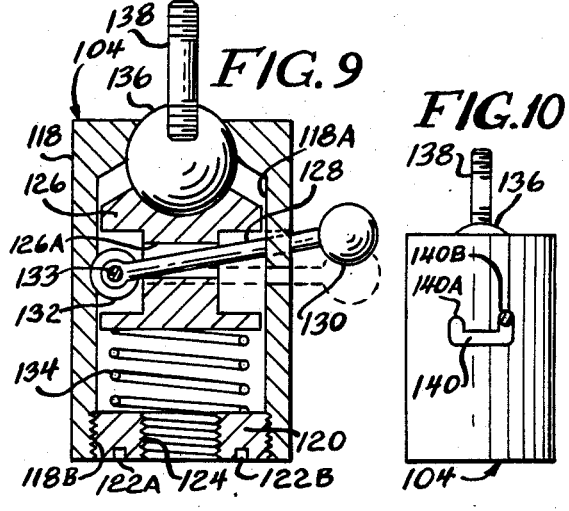

ELECTRONIC MODULE SUPPORT STAND

BACKGROUND OF THE INVENTION

This invention relates generally to support structures and is particularly directed to an adjustable support stand for an electronic module.

Advances in electronic audio synthesizers have led to their increased usage in accompanying musicians and singers. These electronic modules may be used for providing background music, a beat frequency or vocal accompaniment for the musician or singer. To date, access by the musician/singer to the electronic module in exercising control thereover has been limited. This is primarily due to the manner in which the electronic module is positioned near the operator. For example, the electronic module is typically mounted in a generally vertical rack of standard width, i.e., 19 inches. Such racks are not adapted for changing the position or orientation of the electronic module to facilitate operator control thereover. For example, the musician/singer may have to read sheet music while operating an instrument and/or possibly singing into a microphone in front of an audience. This requires the stationary positioning of the performer and easy access by the performer to the electronic module which provides accompaniment or controls the characteristics of the sound provided to the audience. The more conveniently the electronic module is positioned relative to the performer, the better he or she will be able to exercise control over it. The typical support rack available in the prior art not only fails to provide flexibility in the positioning to the electronic module, but is also unwieldy and limits the versatility of the performer/operator.

The present invention is intended to overcome the aforementioned limitations of the prior art by providing an electronic module support stand which provides continuous height adjustment and angular tilt positioning of an electronic module over a wide range of orientations for use by a singer or musician in controlling the operation of the electronic module. The electronic module may be an audio synthesizer or virtually any other type of musical accompaniment device which must be positioned close to the performer who is then able to easily exercise control thereover.

OBJECTS OF THE INVENTION

Accordingly, it is an object of the present invention to provide an improved arrangement for supporting an electronic module.

It is another object of the present invention to provide for the continuous adjustment of the height and tilt angle of an electronic module over a wide range of positions and orientations.

Still another object of the present invention is to provide a multi-purpose support structure particularly adapted for use by a musician or a singer.

A further object of the present invention is to provide a support stand for an electronic module of standard width which permits the module to be positioned and oriented as desired by an operator such as a musician or singer.

The present invention contemplates a support stand particularly adapted for receiving and supporting an electronic module of standard width whereby the module may be stably and securely maintained over a wide range of positions and orientations. The support stand includes an adjustable base upon which is positioned an open mounting rack to which the electronic module may be secured. A manually operated, continuously adjustable locking coupler is located between the base and the mounting rack to permit continuous tilt angle adjustment of the electronic module over a wide angular range. In another embodiment, an in-line rack support frame to which the mounting rack is secured is coupled to an upper portion of the base and provides a tilt capability for the electronic module. The support stand may be provided with a boom to one end of which is mounted a microphone and which also supports the electronic mounting rack. The support stand of the present invention permits the electronic module to be positioned as desired relative to an operator such as a singer or musician who may then easily manipulate the controls of the electronic module.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

FIG. 1 is a perspective view of a support stand for an electronic module in accordance with the present invention;

FIG. 2 is a front view of a portion of the support stand of FIG. 1 particularly showing the mounting rack and upper end portion of the base thereof;

FIG. 3 is a bottom view of the mounting rack used in a preferred embodiment of the electronic module support stand of the present invention;

FIG. 4 is a top view of a cable bracket for use in the electronic module support stand of FIG. 1;

FIG. 5 is as perspective view of an electronic module support stand in accordance with the present invention which includes an in-line rack support frame in which an electronic module is mounted;

FIG. 6 is a side view of an electronic module support stand in accordance with the present invention which includes a boom for supporting a microphone as well as an electronic module;

FIG. 7 is a perspective view of a clamp assembly for use in the electronic module support stand of FIG. 6;

FIG. 8 is a generally vertical cross sectional view of the clamp assembly of FIG. 7;

FIG. 9 is a generally vertical cross sectional view of a locking coupler for controlling the tilt angle of an electronic module positioned upon the support stand of the present invention; and FIG. 10 is a side view of the locking coupler of FIG. 9.

DESCRIPTION OF THE PREFERRED EMBODIMENT

Referring to FIG. 1, there is shown a support stand 10 for supporting electronic modules in accordance with the present invention.

The support stand 10 includes a mounting rack 12 securely coupled to an upper portion of a vertical support member 14. The vertical support member 14 includes a generally vertically oriented outer telescoping member 30 and an inner telescoping member 28. The inner telescoping member 28 is adapted for positioning within the outer telescoping member 30 and for displacement therealong. A threaded locking mechanism 32 of a conventional nature is positioned on an upper end portion of the outer telescoping member 30 for securely engaging the inner telescoping member 28 whereby relative movement between the telescoping members is prevented and the length of the vertical support member 14 is fixed as desired.

Along the length of the vertical support member 14 is positioned a cable bracket 34, shown in detail in FIG. 4. The cable bracket 34 is preferably resilient and includes a curvilinear portion 62, on respective ends thereof are positioned first and second arcuate portions 64, 66. The flexibility, or resiliency, of the cable bracket 34 allows for the relative displacement between the first and second arcuate portions 64, 66 to permit the inner, or outer, telescoping member 28 to be positioned therebetween. Once positioned between the first and second arcuate portions 64, 66, the cable bracket 34 securely engages the inner telescoping member 28 and one or more electrical conductors, shown in FIG. 4 as elements 68 and 69, may be positioned within the opening defined between the inner telescoping member 28 and the curvilinear portion 62 of the cable bracket 34. In this manner, electrical conductors, or leads, connected to a first, upper and a second, lower electronic module 18, 20 may be securely coupled to and positioned along the vertical support member 14 so as not to interfere with an operator exercising control over the first and second electronic modules 18, 20.

Coupled to the lower end of the outer telescoping member 30 of the vertical support member 14 is a base 16 in the form of a tripod in a preferred embodiment. The tripod 16 includes a tripod coupler 36 secured to the lower end of the outer telescoping member 30 and first, second and third support legs 38, 40 and 42 pivotally coupled to the tripod coupler 36. Each of the support legs, as shown in detail for the second support leg 40 in FIG. 1, includes an upper, outer telescoping member 44 and a lower, inner telescoping member 46. The inner telescoping member 46 is adapted for insertion within and displacement along the outer telescoping member 44. Adjacent the open end of the outer telescoping member 44 is a locking mechanism 48 by means of which the inner telescoping member 46 may be locked in position along the length of the outer telescoping member 44 in establishing the length of each of the support legs as desired. In this manner, the support stand 10 may be stably mounted on a sloped or uneven surface, e.g., such as stairs, or the size of the base may be adjusted as desired for providing stable support for the mounting rack 12 and electronic modules 18, 20 positioned thereon. Each of the support legs includes a foot element 50 positioned on the lower end thereof to prevent the sliding displacement of a support leg along the support surface.

Referring to FIG. 1 as well as to FIGS. 2 and 3, which respectively show front and bottom plan views of the mounting rack 12, the manner in which an electronic support module is positioned upon and supported by the support stand 10 of the present invention will now be described in detail. The mounting rack 12 includes a generally flat bottom panel 22, to respective lateral edges thereof are mounted left and right lateral panels 24 and 26. As used herein, the terms "left" and "right" are used with the electronic module support stand viewed from the rear. The mounting rack 12 is adapted for receiving and supporting a plurality of electronic modules 18, 20 and is generally open to afford heat dissipation for electronic modules positioned thereon. The forward portions of each of the left and right lateral panels 24, 26 are provided with respective sets of apertures through which a plurality of screws or bolts 24A and 26A may be inserted for threadably engaging respective lateral, forward portions of the first and second electronic modules 18, 20. Securely coupled to the lower surface of the bottom panel 22 is a threaded swivel mounting bracket 52 which is adapted for engaging an upper, threaded end 138 of a locking coupler 104 which, in turn, is adapted for engaging an upper, threaded end 28A of the inner telescoping member 28 of the vertical support member 14. The locking coupler 104, described in detail below, permits the mounting rack 12 and electronic modules positioned thereon to be stably positioned over a wide range of tilt angles. Also positioned on the lower surface of the bottom panel 22 of the mounting rack 12 are a plurality of generally linear, spaced reinforcing ribs 54, 56, 58 and 60. Each of the reinforcing ribs extends from a respective corner of the bottom panel 28 toward the center thereof and terminates adjacent the threaded swivel mounting bracket 52. The reinforcing ribs enhance the strength of the bottom panel 22 of the mounting rack 12 and permit a plurality of electronic modules to be supported thereon.

Referring specifically to FIG. 2, there are shown left and right extension brackets 35, 37 securely mounted to the left and right lateral panels 24, 26 of the mounting rack 12. Each of the extension brackets 35, 37 is provided with a plurality of apertures along the length thereof which are adapted for alignment with corresponding apertures in the left and right lateral panels 24, 26. With the respective apertures thus aligned, a coupling pin 39, such as a screw or a bolt, may be inserted through two aligned apertures for securely mounting each bracket to a respective mounting rack lateral panel. An electronic module may then be securely mounted to the extension brackets 35, 37 as previously described. The extension brackets 35, 37, which are generally "U" shaped in cross section in a preferred embodiment, thus provide a flexible capability to mount additional electronic modules upon the support stand of the present invention.

Referring to FIG. 5, there is shown another embodiment of an electronic module support stand in accordance with the principles of the present invention. In the embodiment of FIG. 5, a generally rectangular, open in-line rack support frame 70 is positioned on an upper end of a generally vertically oriented lower support member 89. The support frame 70 includes left and right lateral panels 72, 74 and upper and lower panels 76, 78. The various panels comprising the support frame 70 are generally arranged in a rectangular array, with the lower panel 78 including a lower threaded swivel mounting bracket 84 securely coupled to the lower surface thereof. The swivel mounting bracket 84 is adapted for engaging an upper, threaded end portion of the lower vertical support member 89. Each of the left and right lateral panels 72, 74 of the support frame 70 includes an aperture therein through which is inserted a respective pivot pin 80, 82 for pivotally engaging the left and right lateral panels 24, 26 of the mounting rack 12. The mounting rack 12, which supports the first and second electronic modules 18, 20, is thus free to pivot vertically within the support frame 70 to permit the tilt angle of the electronic modules to be adjusted as desired. Coupled to an upper surface of the upper panel 76 is an upper threaded swivel mounting bracket 86 which threadably engages a lower end of an upper vertical support member 88. To the upper end of the upper vertical support member 88 may be mounted other apparatus such as a microphone or support means for positioning sheet music for use by the musician or singer using the electronic module support stand of the present invention. With the in-line rack support frame 70 free to pivot about the axis defined by the upper and lower vertical support members 88, 89 by means of the lower and upper threaded swivel mounting brackets 84, 86 and with the mounting rack 12 free to pivot about pivot pins 80 and 82 within the in-line rack support frame 70, the first and second electronic modules 18, 20 may be oriented as desired by the user of the electronic module support stand.

Referring to FIG. 6, there is shown a side view of an electronic module support stand 10 in accordance with the present invention which includes as boom 98 to which is mounted a microphone 100 and an electronic module mounting rack 12. The base 16 of the support stand of FIG. 6 is generally similar to that shown in FIG. 1 and includes a lower tripod portion comprised of first, second and third support legs 38, 40 and 42 and a vertical support member 14 extending upward from the base, or tripod. An upper end of the inner telescoping member 28 of the vertical support member 14 includes a sleeve coupler 92 to which is attached one end of a pivoting coupler 94. To the other end of the pivoting coupler 94 is securely attached a mounting sleeve through which is inserted a boom 98. The boom 98 is thus pivotally coupled to an upper end portion of the vertical support member 14 by means of the combination of sleeve coupler 92, pivoting coupler 94 and mounting sleeve 96. The pivoting coupler 94 permits the relative angle between the boom 98 and the vertical support member 14 to be adjusted as desired. To one end of the boom 98 is securely mounted a microphone 100. Also mounted to the boom 98 by means of the combination of a clamp assembly 102 and locking coupler 104 is a mounting rack 12 for supporting an electronic module, or modules, (not shown) in a manner previously described. The mounting sleeve 96 is located along the length of the boom 98 intermediate the positions of the microphone 100 and clamp assembly 102 thereon. The microphone 100 thus tends to counterbalance the weight of the mounting rack 12 along the length of the boom 98. In addition, the relative positions of the microphone 100 and mounting rack 12 along the length of the boom 98 permits the user of the electronic module support stand shown in FIG. 6 to utilize the microphone 100 while being able to manipulate the controls of the electronic modules positioned in the mounting rack 12. The locking coupler 104 mounted to the base of the mounting rack 12 permits the tilt angle of electronic modules positioned in the mounting rack 12 to be adjusted as desired as described below.

Referring to FIGS. 7 and 8, there are respectively shown perspective and vertical cross sectional views of the clamp assembly 102 for securing the mounting rack 12 to the boom 98. The clamp assembly 102 includes first and second elongated, generally semi-circular portions 106 and 108 each of which includes a respective inner threaded portion 106A and 108A. The first and second semi-circular portions 106 and 108 are essentially mirror images of each other and are adapted for attachment together along the length thereof by means of first and second threaded coupling pins 114 and 116. Each of the first and second coupling pins 114, 116 includes a respective threaded portion 114A, 116A which is inserted through an aperture of one of the aligned semi-circular portions for engaging a complementary threaded aperture within the lateral surface of the other elongated semi-circular portion. When thus joined by means of the first and second coupling pins 114, 116, a generally cylindrical aperture is formed therebetween extending the length thereof. An upper end of the cylindrical aperture defined by the first and second elongated semi-circular portions 106 and 108 includes threaded portions 106A and 108A for coupling to the lower portion of the locking coupler 104 by means of a threaded member 110 as shown in FIG. 6.

With the first and second elongated semi-circular portions 106, 108 thus joined by means of the first and second coupling pins 114 and 116, a transverse aperture 112 is formed in the thus joined combination. The transverse aperture 112 is adapted to receive the boom 98 and the combination of the first and second elongated semi-circular portions 106, 108 may be tightened by means of the first and second coupling pins 114, 116 so as to securely engage the boom 98 as well as the threaded member 110 which supports the mounting rack 12. It is in this manner that the electronic module mounting rack 12 may be securely positioned along the length of the boom 98 as desired.

Referring to FIGS. 9 and 10 there are respectively shown a vertical sectional view and a side view of the locking coupler 104 used for securing the mounting rack 12 to the boom 98 in a manner such that the tilt angle of an electronic module positioned on the mounting rack 12 may be adjusted as desired. The locking coupler 104 includes a generally cylindrical outer housing 118 within which is formed substantially along the entire length thereof an elongated channel 118A. The open end of the elongated channel 118A includes a threaded portion 118B on an inner surface of the cylindrical housing 118.

Proceeding from top to bottom, there is positioned within the elongated channel 118A in the outer housing 118, a ball 136, an inner housing 126, a spring 134 and a threaded insert 120. The threaded insert 120 is positioned within the elongated channels 118A and engages the threaded portion 118B thereof for securely maintaining the aforementioned components within the elongated channel 118A. The threaded insert 120 includes inner threads for coupling to threaded member 110 as well as a pair of notches 122A, 122B to facilitate the rotational insertion and removal of the threaded insert 120 within the outer housing 118. An upper end portion of the outer housing 118 is provided with an aperture through which a portion of the ball 136 projects. Threadably engaging the ball 136, which is free to rotate within the outer housing 118, is a support shaft 138 which, in turn, engages the threaded mounting bracket on the lower surface of the mounting rack 12. The spring 134 urges the inner housing 126 upward and in engagement with a lower portion of the ball 136. The inner housing 126 includes a generally transverse slot 126A therein within which is positioned an elongated shaft 128. One end of the shaft 128 is pivotally coupled by means of a mounting shaft 133 and a pivot member 132 to the inner portion of the outer housing 118. The other end of the shaft 128 includes a handle 130. The shaft 128 extends through a generally U-shaped slot 140 shown in FIG. 10 with a lateral portion of the outer housing 118. With the shaft 128 pivotally coupled to the mounting shaft 133 and free to move therealong, the shaft 128 is urged upward by means of the biasing action of the spring 134 upon the inner housing 126. The inner housing 126 is thus urged in intimate contact with the lower portion of the ball 136 by means of the biasing spring 134 for maintaining the mounting rack 12 positioned on the upper end of the support shaft 138 in a stable orientation. In this configuration, the shaft 128 of the handle is positioned in the right end portion 140B of the U-shaped slot 140 as shown in FIG. 10. Thus, the combination of the handle shaft 128 and inner housing 126 are in their uppermost position within the outer housing 118 and the ball 136 is restrained from rotating therein. With the handle shaft 128 moved downward and leftward within the U-shaped slot 140 so as to be positioned within the left end portion 140A thereof, the combination of the shaft 128 and inner housing 126 is positioned in a generally lower position within the outer housing 118 and no longer engages the ball 136 in a manner to prevent its rotation. With the ball 136 thus free to rotate within the outer housing 118, the orientation of the mounting rack 12 may be adjusted as desired. When the mounting rack 12 is oriented in the desired position, the handle shaft 128 may be moved within the U-shaped slot 140 to the right end portion 140B thereof in which position the inner housing 126 firmly engages the ball 136 and prevents it from rotating. It is in this manner that the mounting rack 12 coupled to the locking coupler 104 by means of the support shaft 138 may be securely locked in a desired orientation.

There has thus been shown an adjustable support stand particularly adapted for securely positioning an electronic module over a wide range of heights and tilt angles to facilitate the operation thereof by a user. The user, typically a singer or musician, is thus able to position the electronic module, which typically has a width of 19", in a given location and orientation to permit the use of a microphone or other accompaniment apparatus which may also be mounted to the support stand while exercising control over the electronic module.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for supporting a microphone or the like and an electronic module having attachment means on a forward portion thereof, said apparatus comprising:

a variable width base;

a generally vertically oriented support member of variable length coupled to said base;

an open support rack having a generally flat bottom panel and first and second lateral panels coupled to said bottom panel, said first and second lateral panels including mounting means on respective forward portions thereof for engaging the attachment means of the electronic module for mounting the electronic module on said support rack;

adjustable coupling means for securing said support member to said bottom panel whereby the tilt angle of the electronic module may be varied as desired, said adjustable coupling means including an in-line support frame to which said support rack is pivotally mounted, said in-line support frame including a first lower and a second upper panel, wherein said first lower panel is pivotally coupled to an upper end portion of said support member; and mounting means pivotally coupled to the second upper panel of said in-line support frame for pivotally mounting a microphone or the like to said in-line support frame.

2. The apparatus of claim 1 wherein said base includes three legs pivotally coupled to a lower end portion of said generally vertically oriented support member.

3. The apparatus of claim 2 wherein the length of each of said three legs may be varied as desired.

4. The apparatus of claim 1 wherein the generally vertically oriented support member includes an upper shaft positioned within a lower shaft in a telescoping manner, said support member further including locking means coupled to said upper and lower shafts for adjusting the length of said support member as desired.

5. The apparatus of claim 1 wherein the bottom panel of said open support rack includes a plurality of reinforcing ribs positioned therein for increasing the strength thereof.

6. The apparatus of claim 1 further including a cable bracket mounted to said generally vertically oriented support member for engaging and maintaining in stable position an electrical lead coupled to the electronic module.

7. The apparatus of claim 1 wherein the mounting means on said first and second lateral panels includes a plurality of threaded coupling pins for engaging a forward portion of the electronic module.

8. The apparatus of claim 1 wherein the bottom panel of said support rack is 19 inches in width.

9. The apparatus of claim 1 further comprising first and second extension brackets adjustably coupled to respective mounting means on the forward portions of the first and second lateral panels for extending the length of said forward portions for accommodating additional electronic modules aligned in a stacked array.

* * * * *

UNITED STATES PATENT AND TRADEMARK OFFICE
CERTIFICATE OF CORRECTION

PATENT NO. : 4,660,791
DATED : April 28, 1987
INVENTOR(S) : Robert F. Lisak

It is certified that error appears in the above-identified patent and that said Letters Patent is hereby corrected as shown below:

In the title page, the inventor's name should be changed from "Robert B. Lisak" to -- Robert F. Lisak --.

Column 1, line 32, after "positioning", change "to" to -- of --.

Column 2, line 38, after "is", change "as" to -- a --.

Column 5, line 19, after "includes" change "as" to -- a --.

Column 6, line 67, "with" should be -- within --.

Signed and Sealed this

First Day of September, 1987

Attest:

DONALD J. QUIGG

Attesting Officer

Commissioner of Patents and Trademarks